United States Patent Office 2,693,857
Patented Nov. 9, 1954

2,693,857

PROCESS FOR PLUGGING POROUS SANDSTONE FORMATIONS IN A WELL

William A. Marshall, Chicago, Ill., assignor to The Pure Oil Company, Chicago, Ill., a corporation of Ohio No Drawing. Application December 15, 1949, Serial No. 133,220

1 Claim. (Cl. 166—29)

This invention relates to a method for selectively sealing permeable subterranean siliceous formations traversed by a bore hole. It is primarily concerned with effecting this selective sealing by a chemical method.

Sealing agents, both mechanical and chemical, have been used to a great extent in various drilling and production practices carried out for the purpose of obtaining crude mineral oils that are subsequently refined into marketable fractions having a wide variety of applications not attributable to the original crude oil mixture. In initial drilling operations, sealing agents have utility in overcoming problems encountered in drilling through subterranean formations in quest of oil producing sands. The consolidation of loose formations that would normally cave into the bore hole or the exclusion of water from the bore hole because of its accompanying deleterious effects, such as over-dilution of the drilling fluid, are the usual difficulties alleviated by the judicious use of these sealing agents. The overcoming of these problems through the use of sealing agents in many instances will obviate the necessity for using metal pipe casings and thus effect a savings of casing expense.

Once the well is completed and is producing a reasonable amount of crude oil or gas that will economically justify its continued operation sealing agents are again utilized in providing remedial work to reduce gas-oil ratios and also in preventing the intrusion of water that occurs after considerable oil has been taken from the well. Perhaps the most important application of sealing agents is the prevention of this water intrusion. Where the water-oil ratio is of a significant magnitude, it will be seen that considerable expense is incurred for the sole purpose of lifting water. Also the attendant emulsion problems occurring because of this simultaneous production of water and oil necessitate expense which is eliminated if this contaminating fluid is prevented from entering the bore hole.

Additional production applications occur in secondary recovery operations which are employed to increase recovery from oil fields in which the primary reserve has been depleted. In carrying out the practice of secondary recovery an injection well and a producing well are drilled into a common permeable and porous oil-bearing formation or formations through which fluids, such as gas, air and water, are forced under artificial pressure. The reservoir is subjected to the sweeping action of these driving fluids which flushes out the oil remaining after primary depletion. An oil-bearing formation that has been subjected to primary and secondary recovery is essentially depleted of oil and it no longer is a paying horizon. Inasmuch as these oil depleted formations provide a by-pass for the flow system around the producing formations, it becomes desirable to seal off the depleted formations to prevent the ingress of the injection fluid into these permeable strata, known as thief sand, which have no more producible oil and thus control said by-passing. Likewise, it is desirable to shut off highly permeable strata lying contiguous to oil producing formations. The advantages in sealing off these non-producing and/or oil depleted formations which wastefully expend large amounts of energy available from the driving fluid are apparent.

In addition to the wide utilization of cement in plugging methods, a plethora of other agents ranging from arabic gum to zinc chloride have been used. An analysis of the prior art indicates that these agents fall in four general classifications, namely, (1) Those characterized by their ability to react with the mineral salts in solution in the connate waters occurring in subterranean formations to produce plugging precipitates, e. g., superfatted soaps.

(2) Those characterized by their ability to be transformed into plugging precipitates or gels when brought into contact with either fresh water or brines, e. g., silicon tetrachloride.

(3) Those characterized by the fact that they are composed of two mutually precipitable solutions ordinarily injected into a well in sequence, e. g., reaction of sodium carboxymethyl cellulose and ferrous sulfate, or the like, to form a water insoluble precipitate.

(4) Those characterized by their being adapted to set or harden with the passage of time without coming in contact with or reacting with other substances, e. g., urea formaldehyde resin formed in situ.

There are inherent disadvantages to some of these procedures such as non-selectivity or formation of insoluble plugs impervious to any solvent action. Other methods require the presence of natural oil field waters in the formation undergoing treatment.

Accordingly, it is an object of our invention to provide a method for selectively sealing accessible siliceous formations by a chemical method. It is another object to provide for effectively shutting off permeable siliceous subterranean water-bearing strata without at the same time affecting oil or gas-bearing formations. Still another object is to afford a chemical method for selectively sealing a permeable siliceous essentially homogeneous sedimentary subterranean bed which may or may not contain naturally occurring connate waters. A still further object is to produce a water insoluble sealing agent for use in permeable siliceous strata which is susceptible to the action of readily procurable solvents, such as hydrochloric acid, thereby affording a means for readily removing the plug if the occasion demands.

These and other apparent objects are attained by my invention which essentially comprises injecting anhydrous hydrogen fluoride into a permeable siliceous formation in sufficient quantities whereby the reaction between the siliceous formation and the anhydrous hydrogen fluoride forms reaction products which hydrolyze and produce water insoluble gelatinous precipitates in an amount required to effectively plug the said siliceous formation. The chemical method of sealing described herein, is not represented by any of the above mentioned characterizations but is delineated by the ability of the agent to perform effectively in the presence of or absence of interstitial waters. This is effected by formation of the water of hydrolysis, required to precipitate the gelatinous reaction products which clog the formation, as a product of the initial reaction between the siliceous formation and the anhydrous hydrogen fluoride. We are aware that the prior art in the United States Patents Numbers 2,050,931, 2,300,393, 1,990,969, and others, shows the use of hydrofluoric acid per se or in combination with other mineral acids in the treating of oil wells. These applications of hydrogen fluoride, however, take advantage of the disintegrating effect of hydrogen fluoride on siliceous formations in the so-called "acidizing" treatment of wells and have as the end result an increase in permeability. The inherent disadvantages of using hydrogen fluoride as an acidizing agent because of the occurrence of gelatinous precipitates formed as reaction products are pointed out. This unfortuitous circumstance has led to the disuse of hydrogen fluoride per se as an acidizing agent. We, however, have gone a step further and have developed a new and non-analogous use for anhydrous hydrogen fluoride, viz., the use of anhydrous hydrogen fluoride to form a selective water insoluble plugging agent for permeable siliceous formations. By the term selective plugging as used herein is defined to mean that the plugging agent of this invention is injected into a predetermined permeable siliceous formation which is segregated from adjacent formations by employing some form of packing device or bridge means such as described in United States Patent Number 2,221,261.

Tests were conducted on an artificial permeable material consisting of cylindrical cores made of Berea sandstone, the composition of which is essentially representative of siliceous formations encountered in drilling and producing operations. An analysis of a typical Berea sandstone core used in the tests follows:

| Component: | Weight percent |
|---|---|
| $SiO_2$ | 92.9 |
| $CO_2$ | 3.2 |
| $Al_2O_3$ | 2.6 |
| $CaO$ | 1.1 |
| $MgO$ | 0.2 |

In establishing the effect of anhydrous hydrogen fluoride on these sandstone cores, the test cores were dried and weighed and the permeability to nitrogen was determined in a manner commonly used for such determinations. Anhydrous hydrogen fluoride was passed through the core for a given period of time. The amount of anhydrous hydrogen fluoride used in treating the core was determined. The core was cooled to room temperature and its permeability to nitrogen was determined. Weighing of the thus treated core completed the procedure. Table I contains the results obtained by following the method of testing.

In the aforementioned prior art cited to indicate the commonly accepted reaction of hydrogen fluoride and silica and the resulting hydrolysis of the reaction products to form gelatinous precipitates, it will be seen that although attempts were made to prevent the resulting hydrolysis no attempt was made using this reaction to advantage. We have found, however, that by properly restricting the conditions under which anhydrous hydrogen fluoride is injected into a strata it is possible to use the anhydrous hydrogen fluoride as a plugging agent.

In addition, the formation of a silicic acid, resulting from the hydrolysis of the silica tetrafluoride which forms as an intermediate reaction product, not only plugs these formations but also provides an effective cementing material to consolidate and strengthen the sands in the walls of the well.

*Table I*

| Run No. | Temperature of Core, °F. | Time of Treat., Hrs. | $P_1$* | $P_2$** | $P_2/P_1$ |
|---|---|---|---|---|---|
| 1 | 74 | 2 | 94 | 0 | 0 |
| 2 | 74 | 2 | 100 | 0 | 0 |
| 3 | 74 | | 78 | 0 | 0 |
| 4 | 76 | 2 | 205 | 0 | 0 |
| 5 | 150 | 2½ | 162 | 81 | 0.5 |
| 6 | 250 | 5 | 144 | 314 | 2.18 |
| 7 | 250 | 2 | 147 | ∞ | ∞ |

\* Original permeability.
\*\* Final permeability.

The results shown in Table I indicate that anhydrous hydrogen fluoride plugs siliceous formations if the temperature of the formation is maintained below a critical temperature, depending upon the formation pressure, at which the water formed in the initial reaction remains substantially in the liquid phase. It should not be construed from the foregoing that I am limited in the application of this invention to temperatures substantially below 212° F. Obviously the retention of water in substantially the liquid state is dependent upon conditions of pressure as well as temperature, as for example, at an absolute pressure of 300 pounds per square inch the boiling point of water is about 415° F. It is, therefore, within the scope of this invention to provide a means for chemically sealing siliceous formations that is effective providing the conditions of temperature and pressure existent for the duration of the reaction are such that the water formed in the initial reaction remains substantially in the liquid phase. We have also found that the best results are obtained if the permeability of the formation is less than about 200 millidarcies. However, the sealing of more permeable formations should be possible if a temperature below the critical temperature of the formation can be maintained for a time sufficient to allow the hydrolysis reaction to take place while the water reactant is substantially in the liquid phase. The results indicated in Table I, while conducted at substantially atmospheric pressures, show the criticality of temperature.

While the permeabilities of oil sands vary greatly, we have found that in the absence of formation fractures, the permeabilities range from about 10 to about 4,000 millidarcies for said oil sands. The frequency of occurrence of oil sand strata of varying permeability is shown as follows:

| Permeability (millidarcies) | Frequency of Occurrence |
|---|---|
| | Percent |
| 10–100 | 10 |
| 100–500 | 20 |
| 500–1,000 | 40 |
| 1,000–2,000 | 20 |
| 2,000–4,000 | 10 |

This tabulation shows that the incidence of formations capable of being plugged by our procedure while limited is of a practical magnitude.

Methods of sealing siliceous formations penetrated by a bore hole by chemical treatment involve injection of the chemical used into the formation to be sealed. Geophysical methods which measure the electrical characteristics or the radioactive phenomena of the sub-surface strata may be used for surveying the bore hole to determine the location of strata which may be plugged by our method. The most reliable method for directing the flow of the chemical plugging agent into a predetermined strata is to isolate the strata by positive means, such as the use of packers and bridges. This method has the advantage over the direct injection method whereby the treating agent is injected into the bore hole and allowed to seek out the strata to be plugged. The former method provides economy of material especially where the oil sand is more permeable than water sand or where the permeability of the water sand is high.

The novelty and utility of the present invention is further illustrated in the following example, it being understood that the broad scope of the invention is not limited to the specific example herein set forth:

In the Cabin Creek, West Virginia oil fields, sandstone formations having a permeability of about 50 millidarcies and a formation pressure of about 25 pounds per square inch, gauge, are found at a depth of about 3,000 feet. Formation thicknesses vary between 12 and 20 feet. If these formations are precooled to a temperature of about 1000° F. and then segregated from adjacent formations by means of a packing device, selective sealing of these formations is effected by injecting into the formation about 250 pounds of anhydrous hydrogen fluoride. The anhydrous hydrogen is injected under pressure, which incidentally helps maintain the water formed in the initial reaction in the liquid phase, and allowed to remain for about 2 to 5 hours. The remaining unreacted acid is then flushed from the well with any satisfactory flushing fluid, as for example, crude oil or the like.

In the application of this method it is evident that the thickness and initial permeability of the formation are the elements controlling the time of treatment and amount of hydrogen fluoride used. The optimum quantity of hydrogen fluoride to be used is best determined experimentally by making tests on sample cores withdrawn from the formation and projecting these experimental results to conform with the actual field conditions.

If the formation temperature is higher than the critical temperatures hereinbefore set forth, the exigencies of the situation are met by circulating an inert, fluid coolant such as gas, oil or water in and about the formation to be sealed prior to injection of hydrogen fluoride gas, or if an aqueous solution of hydrogen fluoride is used, cooling the solution prior to injection, ordinarily cooling to a temperature of about 50° F. below the maximum permissible reaction temperature will be sufficient, thereby substantially lowering the temperature of the formation to the effective sealing temperature. Preferably the formation temperature is cooled to a temperature below the permissible reaction temperature since the reaction is exothermic and causes rise in temperature.

Although we have directed the application of this invention to the use of anhydrous hydrogen fluoride, it is within the scope and purview of this sealing procedure to use aqueous solutions of hydrogen fluoride, preferably saturated solution in carrying out the objects of this invention. The use of anhydrous hydrogen fluoride, however, is preferred because of the attendant corrosive properties of the aqueous solution of hydrogen fluoride.

Anhydrous hydrogen fluoride is also less harmless physiologically than its aqueous solutions which cause severe and persistent skin ulcerations.

What is claimed as my invention is:

In a method of selectively plugging a permeable siliceous subterranean formation penetrated by a bore hole and having a permeability of less than about 200 millidarcies, the steps comprising precooling the formation to be treated to a temperature substantially less than the boiling point of water by injecting a cooled inert fluid therein; and introducing an amount of hydrogen fluoride sufficient to permeate into and react with said formation to produce reaction products which will further interact with water to form gelatinous precipitates in quantities that will suffice to decrease substantially the permeability of said formation, maintaining said formation in a sufficiently cooled condition whereby any water which is formed in the course of the reaction between said hydrogen fluoride and said formation will remain substantially in the liquid state until it reacts with said reaction products to produce the desired precipitates.

References Cited in the file of this patent

UNITED STATES PATENTS

| Number | Name | Date |
|---|---|---|
| 1,815,876 | Muller | July 21, 1931 |
| 1,820,722 | Zemlin | Aug. 25, 1931 |
| 1,990,969 | Wilson | Feb. 12, 1935 |
| 2,050,931 | De Groote | Aug. 11, 1936 |
| 2,094,479 | Vandergrift | Sept. 28, 1937 |
| 2,200,710 | Bent et al. | May 14, 1940 |
| 2,294,078 | Dow et al. | Aug. 25, 1942 |
| 2,300,393 | Ayers | Nov. 3, 1942 |